Sept. 13, 1949.    A. KANASKE    2,481,672
COLOR EXHIBITING DEVICE
Filed Sept. 26, 1945
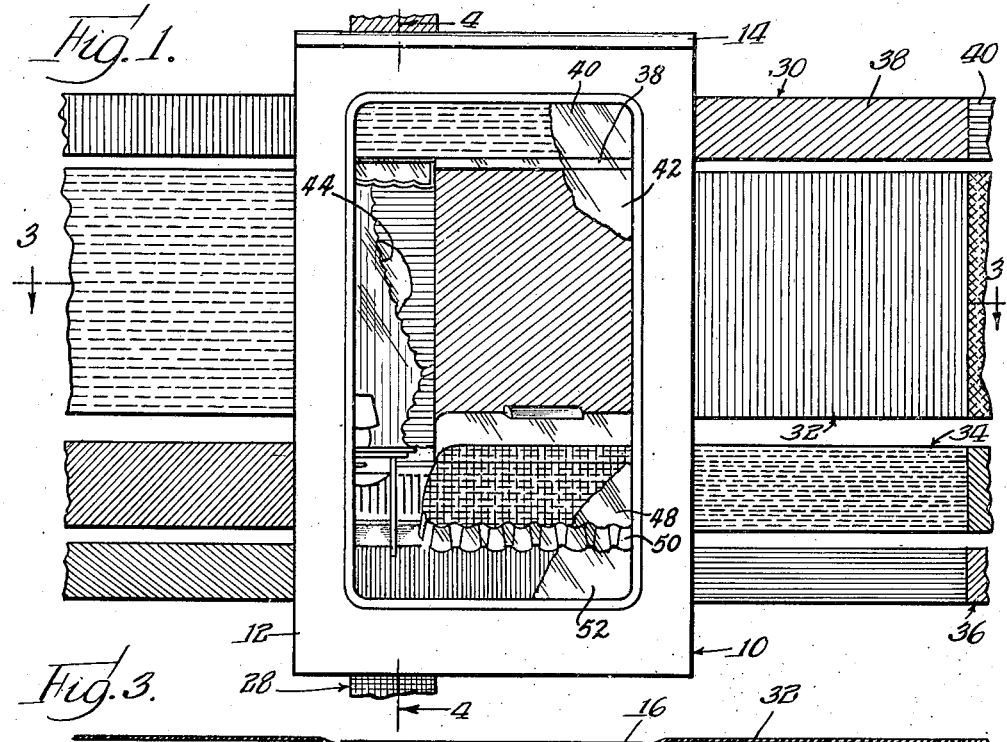
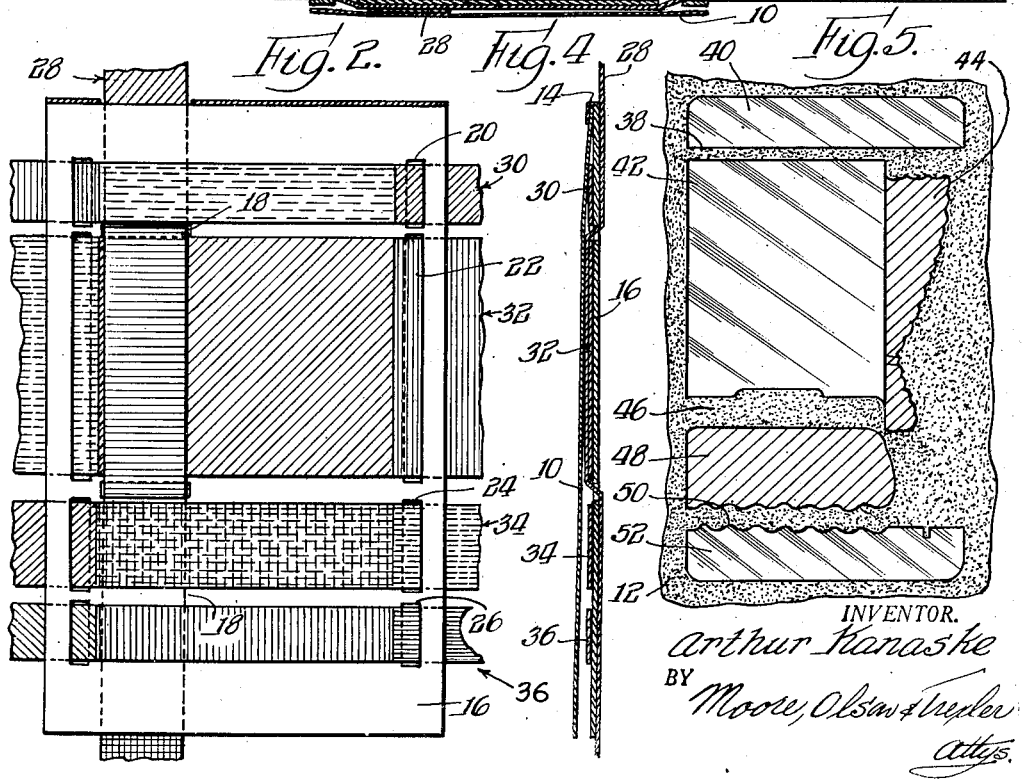
INVENTOR.
Arthur Kanaske
BY Moore, Olson & Trexler
Attys.

Patented Sept. 13, 1949

2,481,672

UNITED STATES PATENT OFFICE 2,481,672

COLOR EXHIBITING DEVICE

Arthur Kanaske, Chicago, Ill., assignor to Benjamin W. Waldie and George L. Briggs, co-partners doing business as Behel and Waldie and Briggs, Chicago, Ill.

Application September 26, 1945, Serial No. 618,674

5 Claims. (Cl. 35—55)

The present invention relates to a color exhibiting device and more particularly an improved device of this kind for the display of colors in conjunction with a pictorial representation.

While those skilled in the art of color harmony are able to arrange different colors, shades, and tints with due regard to the proper tones of colors to be employed, it is advantageous at times to provide an arrangement whereby a person not quite so skilled may be able to see a particular suggested combination of colors. For example in arranging for interior decorating or in the sale of accessories for interiors, it would be desirable to show the customer combinations of colors in order to visually set forth for the customer some concept as to how the arrangement would appear in the customer's home.

While heretofore color charts of various types have been employed, such charts commonly fail to show the user the particular effect to be obtained in certain instances as for example in the instance of the interior decoration of a particular room such as a bedroom, living room, dining room, or the like. It therefore is desirable to provide a color exhibiting device which operates in conjunction with a pictorial representation of the particular thing to which various colors are to be applied.

In the instance of dress ensembles or room furnishings, it is possible in accordance with the present invention to provide a pictorial representation, preferably on a sheet of translucent or transparent material together with color cards or strips which may be interchangeably arranged for association with the different room portions and furnishings. By providing a plurality of color strips, as for example in conjunction with a representation of a room, different colors may be applied to the ceiling, walls, floors, draperies and the furniture.

It, therefore, is an object of the present invention to provide an improved device for color exhibiting in which a pictorial representation may be associated selectively with a plurality of different colors for different portions of the representation.

Still another object of the present invention is to provide an improved color exhibiting device having opaque, translucent, and transparent or cut-out portions for the different representations of various parts of the picture presented with opaque portions overlying and concealing the border between different color strips.

Other and further objects of the present invention subsequently will become apparent by referring to the following description taken in connection with the accompanying drawing wherein Figure 1 is a plan view of the invention;

Figure 2 is a view similar to that shown in Figure 1 with the top sheet member removed;

Figure 3 is a cross sectional view as seen in the direction of the arrows along the line 3—3 of Figure 1;

Figure 4 is another cross sectional view as seen in the direction of the arrows along the line 4—4 of Figure 1; and Figure 5 is a rear view of the top sheet shown in Figure 1 to illustrate the transparent, translucent, and opaque sections.

The embodiment of the invention is illustrated in the drawing as applied to the pictorial representation of a portion of a bedroom. The device has a cover or front sheet 10 provided with an opaque border portion 12 surrounding the scene. The cover 10 is provided with a hinged portion 14 which is secured to the back or base 16. As may be seen from Figure 2 the back or base 16 is provided with a plurality of pairs of openings such as 18, 20, 22, 24, and 26 for receiving a plurality of strips 28, 30, 32, 34, and 36. The pairs of openings 20 to 26 are located adjacent the vertical margins of the base 16 to accommodate the horizontal strips 30 to 36. The pair of openings 18 accommodate the vertical strip 28. Each of these strips is provided with a plurality of sections of different color as may be seen from the right hand portion of Figure 1, where for example the strip 30 has the section 38 indicated as being brown and the adjoining section 40 indicated as being blue. The crosshatching indicated on other sections follows the Patent Office scheme of indicating color.

Preferably the base or back 16 is formed of material of greater rigidity than the remaining parts of the device. Each of the strips 28 to 36 is supported in interlaced fashion by the back 16 and accordingly is preferably of a material having sufficient flexibility to pass through the openings in the back 16 and to lie flat between the back 16 and the front sheet or cover 10. The front sheet or cover 10 may be made of any suitable material so that a plurality of different sections which are opaque, translucent, and clear or transparent may be provided. One of the most convenient materials for this would be a sheet of cellulose material which may be printed or painted so as to provide the different types of areas.

While the term transparent has been used and as is apparent is particularly applicable to a Celluloid sheet or film, it is to be understood that the transparent portions may actually constitute cut-out portions and that the translucent portions for example may be formed, where the sheet 10 is of paper, by suitable oil or wax impregnations of those portions.

From the foregoing it will be appreciated that Figure 5 illustrates one form in which the front sheet 10 may be constructed. The back side shows that the border 12 is opaque. A border portion 38 separates the transparent portion 40 representing the upper portion of the wall or the ceiling from the lower wall portion 42. Adjacent the wall portion 42 is a window having a drape or curtain 44 which for example may be formed so as to be a translucent section. Thus the horizontal strip 32 would extend across the portions 42 and 44 so as to give a brilliant color to the wall and a tint of that color for the drape. Where, however, a vertical strip 28 is used, the drape 44 will be the color of the vertical strip which is superimposed over the horizontal strip. The wall portion 42, which as stated is preferably transparent, is segregated by an opaque portion 46 from a translucent portion 48 representing the bedspread. The lower portion of the bedspread may be provided with a ruffle indicated by an opaque strip 50 which divides the area 48 from the floor area 52. The bedspread area 48 is arranged for cooperation with the horizontal strip 34, and the floor portion 52 is arranged for cooperation with the horizontal strip 36.

While certain areas have been mentioned for purposes of illustration as being translucent and transparent, and these areas delineated by colored opaque areas, it is to be understood that the particular representation shown is merely for purposes of illustration and that other arrangements in keeping with the teaching of the invention may be provided. For example, it will readily be appreciated that the areas 48 in place of being translucent may be transparent but that for example the bedspread area may be covered with spaced apart opaque dots representing tufts such as found on a candlewick spread.

From the foregoing it will be seen that the plurality of color strips provided are maintained in position with respect to the room portions or furnishings to which they are to supply their colors. There is no possibility of displacement of the color strips relative to these portions and by a simple pulling movement any other color may readily be brought into register with a particular portion of the pictorial representation on the device. Hence it will be appreciated that there has been provided an improved color exhibiting device whereby different colors can readily be exhibited and compared in a relative arrangement corresponding to that which would actually exist if the colors were used in a room with furniture or room furnishings.

While for the purpose of illustrating and describing the invention, a particular embodiment has been shown in the drawing, it is to be understood that the invention is equally applicable to other arrangements such as different rooms or different pictorial representation for decorative purposes or for the purpose of providing color combinations in clothing ensembles. It furthermore will be appreciated that the representation of a particular embodiment in the drawing is not to be regarded as a limitation, since such modification of the details and the arrangements thereof are contemplated as may be commensurate with the spirit and scope of the invention as defined in the following claims.

This invention is hereby claimed as follows:

1. A device for exhibiting a pictorial subject having a group of features to be colored differently including a sheet-like support, said support having formed therein a plurality of pairs of opposed spaced openings at least one pair of which is angularly disposed with regard to the others for receiving and slidably holding strips of material, a plurality of strips of material for said openings, each strip having having a plurality of sections differing in surface appearance, and a front sheet of material secured to said support for cooperation therewith and with said strips of material, said front sheet bearing a pictorial subject with an opaque border and having areas through which a plurality of combinations of said sections may be viewed.

2. A device for exhibiting a pictorial subject such as a room and furnishings having a group of features which are to have different surface appearances including a sheet-like support, said support having formed therein a plurality of pairs of opposed openings at least one pair of which is angularly disposed with regard to the remainder of said pairs for receiving and slidably holding strips of material, a plurality of strips of material laced through said openings and movable independent of each other, each strip of said material having a plurality of sections differing in surface appearance, and a front sheet of material secured to said support for cooperation therewith and with said strips of material, said front sheet having a pictorial subject such as a room and furnishings enclosed in an opaque border and having areas through which a plurality of combinations of said sections of said strips of material may be viewed.

3. A device for exhibiting a pictorial subject having a group of features for which surface finishes are to be selected comprising a relatively rigid sheet-like support, said support having formed therein a plurality of pairs of openings for receiving and slidably holding strips of material, a plurality of strips of material positioned in said openings in interlaced fashion and movable independent of each other, each strip of material having a plurality of sections differing in surface appearance, a front sheet of material secured to at least one edge of said support for cooperation therewith and with said strips of material, said front sheet comprising a sheet of transparent material having a room and furnishings depicted in perspective with substantially opaque coating, said coating being applied so as to leave visible areas through which said materials having different surface appearances are to be selected, said opaque coating being positioned so as to conceal the edges of said strips of material.

4. A device for exhibiting a pictorial subject having a group of features for which surface appearances are to be selected comprising a sheet-like support, said support having formed therein a plurality of pairs of spaced apart openings for receiving and slidably holding strips of material, a plurality of relatively flexible strips of material mounted in said openings and movable independent of each other, each strip of material having a plurality of sections each of a different surface appearance, certain of said strips extending transversely of said support, and at least one strip extending at an angle to said transversely extending strips, and a front sheet of material secured at at least one edge of said support for cooperation therewith and with said strips of material, said front sheet being formed of material which is at least translucent to transparent, said sheet having opaque coating material applied thereto to delineate visible areas through which different surface appearances are to be selected by movement of said strips of material.

5. A device for exhibiting a pictorial subject having a group of features for which different surface appearances are to be selected comprising a support formed of a sheet of paper board, said support having formed therein a plurality of pairs of opposed spaced apart openings for receiving and slidably holding strips of material, a plurality of relatively flexible strips of material such as paper mounted in said openings, certain of said strips extending transversely of said support, and at least one of said strips extending at an angle to the first mentioned strips extending transversely, each strip of material having a plurality of sections differing in surface appearance, and a front sheet of transparent material such as Celluloid having at least one edge secured to said support for cooperation therewith and with said strips of material, said front sheet having depicted thereon a pictorial subject with substantially opaque coating material, said coating material being applied so as to leave areas of surface through which different surface appearances may be viewed.

ARTHUR KANASKE.

REFERENCES CITED

The following references are of record in the file of this patent:

UNITED STATES PATENTS

| Number | Name | Date |
|---|---|---|
| 566,797 | Roller | Aug. 11, 1896 |
| 572,216 | Patton | Dec. 1, 1896 |
| 1,184,800 | Wastie | May 30, 1916 |
| 1,246,076 | Fairbanks | Nov. 13, 1917 |
| 1,264,653 | Jelliffe | Apr. 30, 1918 |
| 1,506,067 | Lamb | Aug. 26, 1924 |
| 1,530,082 | Hutter | Mar. 17, 1925 |
| 2,155,924 | Barrett | Apr. 25, 1939 |
| 2,294,131 | Raymond | Aug. 25, 1942 |

FOREIGN PATENTS

| Number | Country | Date |
|---|---|---|
| 319,519 | Great Britain | 1929 |
| 454,745 | Great Britain | 1936 |

Certificate of Correction

September 13, 1949

Patent No. 2,481,672

ARTHUR KANASKE

It is hereby certified that errors appear in the printed specification of the above numbered patent requiring correction as follows:

Column 4, line 44, after the word "openings" insert *at least one pair of which is angularly disposed relative to the others*; column 5, line 4, strike out "at least"; line 20, strike out "first mentioned";

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*